Sept. 16, 1958      C. T. BICKNER      2,852,051
POWER OPERATED HAND MANIPULATED ROUTER
Filed Jan. 3, 1957
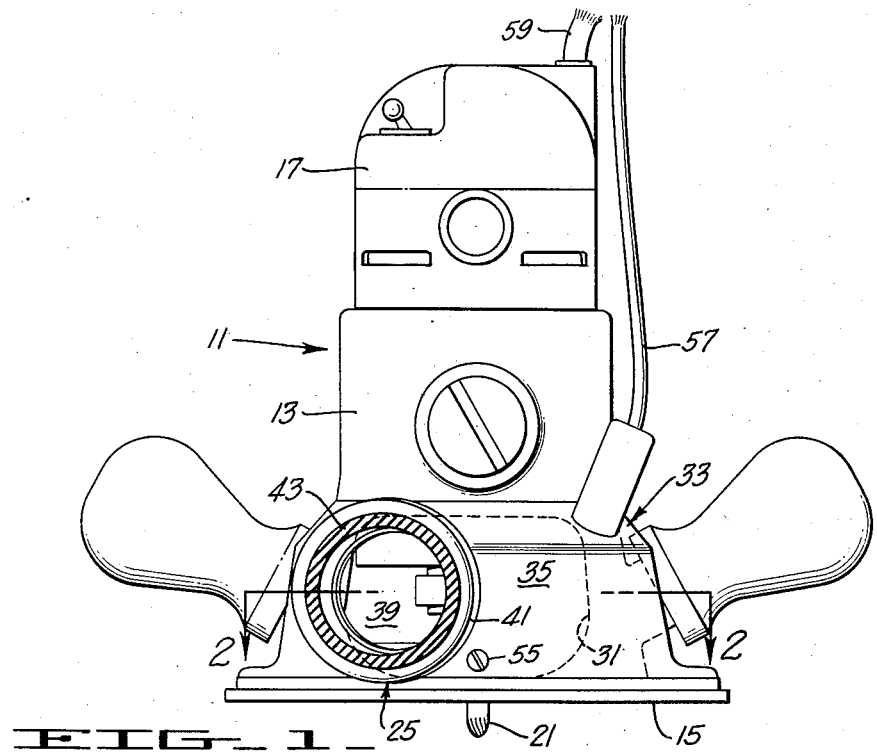
FIG_1_
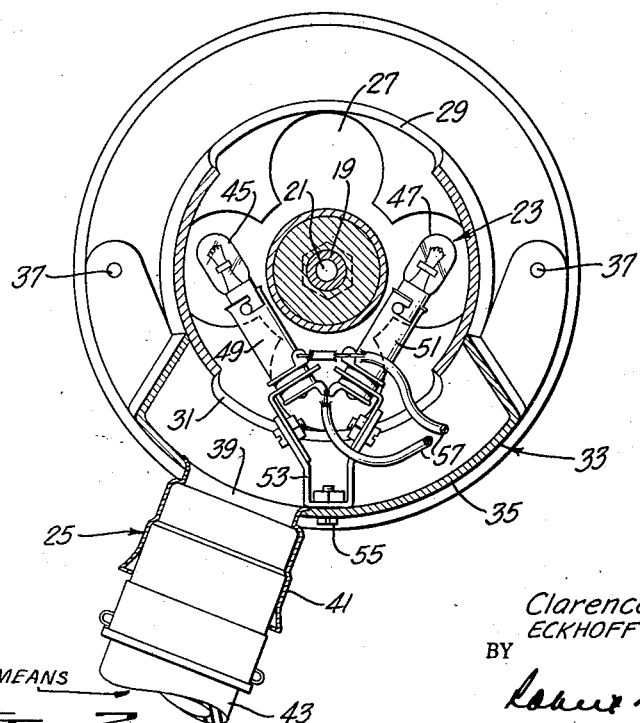
TO SUCTION MEANS
FIG_2_
INVENTOR.
Clarence T. Bickner
ECKHOFF & SLICK, Attys.
BY
A member of the firm United States Patent Office 2,852,051
Patented Sept. 16, 1958

2,852,051

POWER OPERATED HAND MANIPULATED ROUTER

Clarence T. Bickner, Richmond, Calif.

Application January 3, 1957, Serial No. 632,384

6 Claims. (Cl. 144—136)

This invention relates to routers, and, more particularly, to power operated, hand manipulated tools for milling out the surface of wood or the like in ornamental grooves.

While hand manipulated routers are generally known, their use is often restricted, or made more difficult, by the inability of the operator to obtain a good view of the work as it progresses. When cutting free-hand ornamental designs, good visibility of the area immediately adjacent to the cutting tool is essential. Previous designs, as epitomized by Patent No. 2,562,143, do provide inspection openings at the opposite sides of the tool through which the cutting tool may be observed. The structure of the tool, however, tends to shroud the work area, cutting down on the illumination of the cutting tool. Further, the usual tool includes a built-in fan to cool the motor. This fan also serves to scatter chips and fine particles over the adjacent area, including the operator.

To obviate these difficulties and provide for better viewing of the work surface and cutting tool, the present invention contemplates illuminating the work area with an independent light source in such manner that the cutting tool and surrounding area will be visible at all times to the operator of the tool. The invention further provides an effective method of removing cuttings and other debris from the area and so make the operation of the apparatus dust-free.

It is, therefore, a principal object of the present invention to provide a router in which the work area and cutting tool are clearly visible to the operator at all times.

Another object of the present invention is to provide a router in which the work being performed is illuminated by an independent light source arranged to afford a clear and shadowless view of the cutting tool and work surface.

A further object of the present invention is the provision of a router in which the cuttings and other debris are removed in an organized manner from the work area as the cuttings and debris are formed.

A still further object of the present invention is the provision of an attachment for existing hand manipulated routers which will illuminate the work surface in the manner aforesaid and which may be attached to a vacuum source for removing chips and cuttings.

Other objects and features of advantage will become apparent from a consideration of the following description and of the accompanying drawings forming a part of this specification.

With reference to said drawings:

Figure 1 is a side elevational view of a router constructed in accordance with the present invention.

Figure 2 is a plan sectional view of the router taken substantially on the plane of line 2—2 of Figure 1.

The router 11 of the present invention consists basically of a frame 13 having a work engaging lower surface 15, a motor 17 mounted on the frame and having a perpendicular shaft 19 supporting a cutting tool 21, light means 23 for illuminating the cutting tool, and suction means 25, effective to remove cuttings from the area of tool 21. In routers of this type, the motor 17 is vertically adjustable within the frame 13 so as to permit the cutting tool to project downwardly through a central opening 27 in surface 15 a distance equal to the depth of cut desired. The router frame 13 is normally provided with a pair of openings 29 and 31 at opposite sides thereof through which the cutting tool is visible to the operator. Advantage is taken of this construction by providing the light means 23 and suction means 25 in a unitary assembly 33, which may be incorporated in new machines, or attached to existing routers.

As here shown, attachment 33 includes a hood 35 of semicircular form adapted to be fastened to the router frame 13, as by screws 37, in surrounding relation to opening 31. The suction means 25 is preferably provided by forming an opening 39 through the hood 35 and mounting a fitting 41 therearound, the fitting being adapted for connection to a flexible conduit or hose 43 which is in turn connected to a source of vacuum such as a blower or the like (not shown). Operation of the blower will create a lower than atmospheric pressure at the fitting 41 which will draw air through the opening 29 and past the cutting tool with sufficient velocity to sweep the cuttings from the work area.

As an important feature of the invention, a strong shadowless light is directed upon the cutting tool 21 and surrounding area from the light means 23. To provide such light, a pair of light sources 45 and 47 are mounted at the opposite sides of the cutting tool 21. As here shown, these light sources comprise a pair of small electric bulbs mounted in suitable type sockets 49 and 51 carried by a bracket 53 secured to the hood by a bolt 55. The bracket 53 is formed so that the bulbs are close to the cutting tool, both laterally and vertically, so that a clear illumintion of the desired area may be had from relatively small bulbs. Any suitable source of power for the light bulbs may be provided. As here illustrated, the bulbs 45 and 47 are connected in parallel by wires 57, which may conveniently be tapped into the power lead 59 to the motor 17. Preferably, the central opening 27 in the router is cut out in a four leaf clover shape to permit good visibility of the work in the area surrounding the cutting tool, for following guide lines, while at the same time providing a good sweeping action by the suction means. This is important because it prevents the fine dust and chips from being thrown about, particularly into the operator's eyes and nose.

While the salient features of this invention have been described in detail with respect to certain embodiments thereof, it will, of course, be apparent that certain modifications may be made within the spirit and scope of this invention, and it is not desired, therefore, to limit the invention to the exact details shown except insofar as they may be defined in the following claims.

I claim:

1. A router comprising a frame having a work engaging lower surface, a motor mounted on said frame and having a shaft perpendicular to said surface, a cutting tool supported on said shaft and extending below said surface, light means carried by said frame for illuminating said cutting tool, and suction means carried by said frame and effective to remove cuttings from the area of said tool.

2. A router comprising, a frame having a work engaging lower surface and being formed with a side inspection opening and a cut-out portion of said surface, a motor mounted on said frame and having a shaft perpendicular to said surface, a cutting tool supported on said shaft and extending through said cut-out portion, a hood partially surrounding said cutting tool, a conduit opening into said hood and adapted for connection to a vacuum source for removing cuttings from the area of said tool, and light means carried by said hood and positioned on opposite sides of said tool for illumination thereof.

3. An attachment for a router having a motor supported by a frame formed with opposed side openings and a bottom opening and a cutting tool extending through said bottom opening, said attachment comprising, a hood adapted for connection to said frame in surrounding relation to one of said openings, light means in said hood for illuminating said cutting tool, and a conduit opening into said hood and adapted for connection to a source of vacuum for removing cuttings from said hood and the immediate area of said cutting tool.

4. An attachment for a router having a motor supported by a frame formed with opposed side openings and a bottom opening and a cutting tool extending through said bottom opening, said attachment comprising, a hood adapted for connection to said frame in surrounding relation to one of said openings, a pair of light sources mounted on said hood and positioned on opposite sides of said cutting tool, and a conduit opening into said hood and adapted for connection to a source of vacuum for removing cuttings from said hood and the immediate area of said cutting tool.

5. A router comprising a frame having a work engaging lower surface, a motor mounted on said frame and having a shaft perpendicular to said surface, a cutting tool supported on said shaft and extending below said surface, and suction means carried by said frame and effective to remove cuttings from the area of said tool to a point removed therefrom.

6. A router comprising a frame having a work engaging lower surface and being formed with a side inspection opening and a cut-out portion of said surface, a motor mounted on said frame and having a shaft perpendicular to said surface, a cutting tool supported on said shaft and extending through said cut-out portion, a hood partially surrounding said cutting tool, and light means carried by said hood and positioned on opposite sides of said tool for illumination thereof.

References Cited in the file of this patent
UNITED STATES PATENTS

| | | |
|---|---|---|
| Re. 20,687 | Grozier | Apr. 5, 1938 |
| 2,100,566 | Munding | Nov. 30, 1937 |
| 2,246,916 | Fischer | June 24, 1941 |
| 2,525,588 | Cameron et al. | Oct. 10, 1950 |
| 2,756,785 | Godfrey | July 31, 1956 |